2,834,817

PURIFICATION OF THE GAMMA ISOMER OF BENZENE HEXACHLORIDE

Ernest Marcel Dégeorges and Jean Lehureau, Lyon, France, assignors to Progil, Paris, France, a corporation of France No Drawing. Application December 8, 1954
Serial No. 474,034

Claims priority, application France December 9, 1953

10 Claims. (Cl. 260—648)

This invention relates to the purification of lindane and other gamma isomer concentrates, and also to the production of substantially pure gamma isomer of benzenehexachloride in the form of large, bright, transparent crystals.

It is known that lindane is composed of the gamma isomer of benzenehexachloride of a concentration of 99% or more and that this product as well as other gamma isomer concentrates can be purified only with great difficulty. This difficulty is attributed to the fact that part of the impurities present, determined to be of the nature of a wax or oil by chromatographic analysis, become fixed on the gamma isomer particles during precipitation from its solution in organic solvents, this result being obtained in spite of the fact that the impurities are soluble in these solvents and are present therein in percentages very far from amounts corresponding to saturation. For this reason, when lindane is being purified several successive crystallizations must be carried out, pure solvent being used in each operation, in order to obtain the pure gamma isomer.

Due to the process of production of the benzenehexachloride, lindane and other gamma isomer concentrates contain also as impurities other isomers than the gamma isomer, as the alpha and beta isomers and also heptachlorobenzene and octochlorobenzene, herein referred to as "chlorinated benzene impurities."

An object of the present invention is to purify lindane and other gamma isomer concentrates substantially completely by a process involving low material cost which is efficient in operation with avoidance of any appreciable loss of the gamma isomer. Another object is to provide the gamma isomer in a new form, that is as large, bright, transparent crystals.

Broadly, the invention may be considered to involve processes for the production of the gamma isomer of benzenehexachloride of increased purity from lindane and other gamma isomer concentrates containing impurities as a result of the conventional process of its manufacture, which include as the basic step the heating of lindane or other gamma isomer concentrate in highly concentrated nitric acid at atmospheric or superatmospheric pressure at a temperature which dissolves the gamma isomer, next cooling the solution to crystallize out the gamma isomer and then separating and recovering the nitric acid from the gamma isomer crystals.

The success of the process is based on the discovery that the gamma isomer is very soluble in hot pure or highly concentrated nitric acid and is substantially insoluble in the cold acid.

For obtaining satisfactory results, the highly concentrated nitric acid should be of a density of at least 1.48. Fuming nitric acid or nitric acid containing from about 5% to 10% nitrogen oxides in solution may be employed. The temperature at which the dissolution is carried out is also of substantial importance to the success of the operation. Optimum results require operation under conditions equivalent to 85°–87° C. at atmospheric pressure.[1] At temperatures below about 85° C. the solubility of the gamma isomer is too slight and at temperatures above 87° C. under normal pressure the nitric acid partially decomposes and its dissolving capacity with respect to the gamma isomer decreases. The proportions of the nitric acid in relation to the lindane or other concentrate may be varied considerably, but practically the ratio used generally varies between 0.7–1 part of nitric acid to 1 part of the benzenehexachloride composition.

In order to effect more thorough purification, the heating operation is carried out for a period necessary to effect substantially complete oxidation of the waxy, oily impurities through a nitration reaction, the time required for this dissolving operation generally being about one hour. The period, however, should not be any longer than necessary, for during extended period appreciable destruction of the gamma isomer will occur. It has been determined that when lindane is heated to a sufficiently high temperature under pressure in the presence of pure highly concentrated nitric acid it is almost completely destroyed.

Although the process as hereinbefore described will partially purify lindane and other concentrates, the production of the gamma isomer in substantially completely pure condition requires that additional controls and process steps be taken to remove the chlorinated benzene impurities. These additional operations are based on discoveries as to selective dissolution and crystallization characteristics of the gamma isomers in relation to the various chlorinated benzene impurities.

The discovery on which the first purification step for the removal of these additional impurities is based is that the chlorinated benzene impurities, i. e. the alpha and beta isomers of benzenehexachloride and the heptachloro- and octachlorobenzenes are very slightly soluble in the hot nitric acid. Hence an additional step in the process hereinbefore described involves separation of the gamma isomer from the acid solution by hot filtration, decantation or other equivalent separation procedure. This hot filtration is suitably effected immediately after completion of the treatment with the hot nitric acid before its temperature drops or without permitting the solution to cool.

Another purification step for the removal of chlorinated benzene impurities is based on the discovery that the gamma isomer precipitates very quickly from the hot solution whereas the chlorinated hydrocarbon impurities precipitate slowly. Accordingly, the process of the present invention for the production of pure lindane includes a rapid cooling of the hot nitric acid solution to effect selective crystallization. The permissible rate of cooling required may vary with different solutions but in any particular instance the rate at which the gamma isomer will crystallize out before the other isomers crystallize in the solution can be determined by simple test.

It has been observed, however, that if the cooling rate is too rapid in the beginning, impurities may be entrapped in the gamma isomer crystals. Accordingly, the cooling from 87° C. down to about 70° C. should be slow enough to avoid the freezing of the whole heterogeneous mass (2 liquid phases: gamma isomer dissolved in nitric acid and nitric acid dissolved in gamma isomer).

A rate of cooling of 0.5° to 1° C. per minute generally gives good results for the initial cooling period and when the temperature has reached 70° C. the cooling below this level may be carried out at a considerably more rapid rate.

---

[1] Pressures up to 20 to 22 p. s. i. are suitable with temperatures reaching as high as 110° C.

The crystals of pure gamma isomer are without delay filtered or otherwise separated from the cooled mother liquor, and to complete the purification, the crystals may be washed with a small amount of pure nitric acid, next washed with water and finally dried. The washing with nitric acid removes various nitrogen derivatives which are soluble in nitric acid and slightly soluble in water.

The residual cold nitric acid liquor is then stored in the cold or at room temperature, and during this period, the chlorinated benzene compounds which were impurities in the gamma isomer concentrate precipitate out in the form of a microcrystalline, granular, dull powder. These crystals settle slowly and are separated from the nitric acid as by filtering or decantation. The nitric acid obtained from this step as well as any nitric acid employed in washing the gamma isomer crystals may be recycled in the instant process, after reconcentration if necessary.

*Example 1*

One kilogram of lindane containing 99% gamma isomer, and 0.7 kg. of nitric acid of 48.5° Baumé are heated for one hour at 85°–87° C. under atmospheric pressure. The solution is then cooled to 25° C. over a period of forty minutes during which time the gamma isomer crystallizes. The isomer is thereupon separated by filtration and is washed with 48° Baumé nitric acid, next with 36° Baumé nitric acid and finally with water until the mass is no longer acidic. Upon drying, 985 grams of the purified gamma isomer are obtained.

*Example 2*

One kilogram of a gamma isomer concentrate of 98% purity is heated with 1 kg. of nitric acid of 48.5° Baumé at 85°–87° C. for one hour under atmospheric pressure. The mass is thereupon cooled to 40° C. in forty minutes and the gamma isomer crystals obtained are rapidly filtered off, washed and dried as described in Example 1. Nine hundred and sixty grams of the pure gamma isomer are recovered.

The mother liquor together with the 48° Baumé nitric acid wash solution used in purifying the crystals is permitted to stand to effect precipitation of the chlorinated benzene compounds therein. The solid material separated from the nitric acid is composed primarily of a mixture of isomers other than the gamma isomer together with benzene hexa-, hepta-, and octo-chlorides.

*Example 3*

The recovered nitric acid from which the chlorinated benzene compounds have been removed are recycled in the process and used in the procedure set forth in Example 2, the proportions being 1 kg. of recycled solution with 1 kg. of lindane. Through this procedure, 965 grams of pure gamma isomer are obtainable.

The recycling of the nitric acid may be repeated many times and when such steps are taken, the consumption of pure nitric acid is limited to that of the first washing operation, the amount added being such that it compensates for the quantity of acid retained by the cake of the gamma isomer obtained in the filtering step.

*Example 4*

One kilogram of a gamma isomer concentrate of 95% purity together with 1 kg. of 48.5° Baumé nitric acid are heated for 1 hour at 85°–87° C. The solution obtained is hot filtered to remove the undissolved chlorinated benzene impurities and the operations described in either Example 2 or in Example 3 are carried out for completing the process.

*Example 5*

One kilogram of a gamma isomer concentrate of 95% purity is mixed with 1 kg. of concentrated nitric acid containing nitrogen peroxide and heated in an autoclave for a period of 1 hour. Thereupon the undissolved impurities are separated by hot filtration in a filter upon which the autoclave is mounted. The filtrate obtained is rapidly cooled under stirring in a closed vessel and the resulting cooled mass is again filtered to obtain the pure gamma isomer crystals. The cake of gamma isomer crystals is washed on the filter with pure nitric acid and washed and dried as in Example 1. The nitric acid filtrate together with the nitric acid employed in washing the crystals on the filter are allowed to stand at room temperature and then, after decantation, the solution is recycled in the process.

An advantage of the process of the present invention is that the recovery of the gamma isomer is substantially quantitative, for more than 99.5% is obtained. It is clear, therefore, that the gamma isomer does not undergo any chemical reaction even at the high temperatures described herein and even if pressure is employed in an autoclave. The gamma isomer is obtained in a unique form of large transparent crystals.

It should be understood that the present invention is not limited to the specific details herein described as to procedures, conditions and proportions but that it extends to all equivalents within the scope of the claims herein which may be determined by simple tests carried out by persons skilled in the art.

The gamma isomer, in the form of large transparent crystals, is free from any smell and it does not impart any musty taste to vegetables treated therewith: that is in contrast with what occurs when known products are used.

We claim:

1. A process for the removal of both odor-imparting impurities and chlorinated benzene impurities from a benzene-hexachloride gamma isomer concentrate which comprises mixing the concentrate with nitric acid of a density of at least about 1.48 in a quantity which will react with the odor-imparting impurities and also dissolve substantially all of the gamma isomer content during the subsequent heating operation, heating the resulting mass to a temperature at which the nitric acid reacts with the odor-imparting impurities, and at which the gamma isomer and unavoidably also some of the chlorinated benzene impurities are dissolved, rapidly cooling the resulting solution to a temperature at which substantially only the gamma isomer crystallizes out, and separating such crystals from the acid solution still containing the dissolved impurities.

2. A process for the removal of both odor-imparting impurities and chlorinated benzene impurities from a benzene-hexachloride gamma isomer concentrate which comprises, mixing the concentrate with nitric acid of a density of at least about 1.48 in a quantity which will react with the odor-imparting impurities and also dissolve substantially all of the gamma isomer content during the subsequent heating operation, heating the resulting mass to a temperature of from about 85° C. at atmospheric pressure up to a temperature of about 110° C. at 22 p. s. i., rapidly cooling the resulting solution to a temperature at which substantially only the gamma isomer crystallizes out and separating such crystals from the acid solution still containing the dissolved impurities.

3. The process of claim 2 wherein the temperature at which the concentrate is heated is about 85° to 87° C. at atmospheric pressure.

4. A process for the removal of both odor-imparting impurities and chlorinated benzene impurities from a benzene-hexachloride gamma isomer concentrate which comprises, mixing the concentrate with nitric acid of a density of at least about 1.48 in a quantity which will react with the odor-imparting impurities and also dissolve substantially all of the gamma isomer content during the subsequent heating operation, heating the resulting mass to a temperature at which the nitric acid reacts with the odor-imparting impurities, and at which the gamma isomer and unavoidably also some of the chlorinated benzene impurities are dissolved, separating the resulting solution while still hot from the chlorinated benzene impurities which have remained undissolved in the solution, rapidly cooling the resulting solution to a temperature at which substantially only the gamma isomer crystallizes out and separating such crystals from the acid solution still containing the dissolved impurities.

5. The process of claim 4 wherein the temperature at which the concentrate is heated is about 85° to 87° C. at atmospheric pressure.

6. A process for the removal of both odor-imparting impurities and chlorinated benzene impurities from a benzenehexachloride gamma isomer concentrate which comprises, mixing nitric acid of a density of at least about 1.48 with the concentrate in a quantity of 0.7–1 part to 1 part, respectively, by weight, heating the resulting mass at a temperature at which the nitric acid reacts with the odor-imparting impurities, and at which the gamma isomer and unavoidably also some of the chlorinated benzene impurities are dissolved, rapidly cooling the resulting solution to a temperature at which substantially only the gamma isomer crystallizes out, and separating such crystals from the acid solution still containing the dissolved impurities.

7. A process for the removal of both odor-imparting impurities and chlorinated benzene impurities from a benzenehexachloride gamma isomer concentrate which comprises, mixing the concentrate with fuming nitric acid in a quantity which reacts with the odor-imparting impurities and also dissolves the gamma isomer during the subsequent heating operation, heating the resulting mass to a temperature at which the nitric acid reacts with the odor-imparting impurities, and at which the gamma isomer and unavoidably also some of the chlorinated benzene impurities are dissolved, rapidly cooling the resulting solution to a temperature at which substantially only the gamma isomer crystallizes out, and separating such crystals from the acid solution still containing the dissolved impurities.

8. The process of claim 7 wherein the nitric acid used contains nitrogen peroxide.

9. A process for the removal of both odor-imparting impurities and chlorinated benzene impurities from a benzenehexachloride gamma isomer concentrate which comprises, mixing the concentrate with nitric acid of a density of at least about 1.48 in a quantity which will react with the odor-imparting impurities and also dissolve substantially all of the gamma isomer content during the subsequent heating operation, heating the resulting mass to a temperature of from about 85° C. at atmospheric pressure up to a temperature of about 110° C. at 22 p. s. i., separating the resulting solution while still hot from the chlorinated benzene impurities which have remained undissolved in the solution by filtering the hot solution, cooling the solution at a rapid rate which selectively crystallizes the gamma isomer while leaving the dissolved chlorinated benzene impurities in solution, separating the obtained large, bright, transparent, gamma isomer crystals from the nitric acid solution and the impurities contained in the solution, washing the crystals successively with highly concentrated nitric acid and water, and finally drying the purified gamma isomer crystals.

10. The process of claim 1 wherein the concentrate treated is lindane.

References Cited in the file of this patent

FOREIGN PATENTS 915,094     France _____ July 8, 1946